United States Patent [19]
Bannai et al.

[11] Patent Number: 5,082,451
[45] Date of Patent: Jan. 21, 1992

[54] CLOCK SPRING CONNECTOR WITH CABLE DRIVING MECHANISM

[75] Inventors: Hiroyuki Bannai, Furukawa; Hironori Kato, Sendai, both of Japan

[73] Assignee: Alps Electric Co., Ltd., Tokyo, Japan

[21] Appl. No.: 633,885

[22] Filed: Dec. 26, 1990

[30] Foreign Application Priority Data

Dec. 26, 1989 [JP]  Japan .............................. 1-148720[U]

[51] Int. Cl.[5] ............................................ H01R 35/04
[52] U.S. Cl. ....................................... 439/164; 439/15
[58] Field of Search ...................... 439/15, 164, 13, 16

[56] References Cited

U.S. PATENT DOCUMENTS

| | | | |
|---|---|---|---|
| 3,763,455 | 10/1973 | Confer et al. | 439/15 |
| 4,540,223 | 9/1985 | Schmerda et al. | 439/15 |
| 4,721,469 | 1/1988 | Carlson | 439/13 |
| 4,978,191 | 12/1990 | Hasegawa et al. | 439/164 |

Primary Examiner—Gary F. Paumen
Attorney, Agent, or Firm—Guy W. Shoup; David W. Heid

[57] ABSTRACT

A clock spring connector of the present invention is used in steering systems of automobile cars and comprises a stationary member and a movable member rotatably mounted relative to the stationary member, both of which are electrically connected to each other by using cables. The cables are received in receiving portions formed by the stationary member and the movable member, and a spacer having an opening is rotatably interposed between the stationary member and the movable member. The cables and a driving belt are wound in one of the receiving portions separated from each other by the spacer, the remaining portion of each of the cables and the driving belt and the being wound in the other receiving portion through the opening. A driving roller which engages with the driving belt is disposed in the opening.

2 Claims, 6 Drawing Sheets

CLOCK SPRING CONNECTOR WITH CABLE DRIVING MECHANISM

BACKGROUND OF THE INVENTION

The present invention relates to a clock spring electrical connector used in automobile steering systems or the like which comprises a stationary member and a movable member which are electrically connected to each other by using cables.

Clock spring connectors are generally used as electrical connectors, for example, in automobile steering systems or the like and comprise a stationary member and a movable member rotatably mounted relative to the stationary member, these members being electrically connected to each other by using flexible cables.

A known example of such a clock spring connector comprises a cable receiving portion provided between a stationary member and a movable member, and a flat cable which is formed by laminating a plurality of conductor strips between two band films and which is wound into a coil and gently received in the cable receiving portion, one end of the flat cable being fixed to an outer ring wall formed in either the stationary member or the movable member, the other end being fixed to an inner ring wall formed in the other member.

This clock spring connector permits the flat cable received in the cable receiving portion to be wound on the inner ring wall and rewound on the outer ring wall in correspondence with the rotational direction of the movable member. There is thus substantially no tension acting on the flat cable between a state where the flat cable is completely wound on the inner ring wall and a state where the flat cable is completely rewound on the outer ring wall. It is therefore possible to maintain the electrical connection between the stationary member and the movable member both of which rotate relative to each other.

In the above-described clock spring connector, since the flat cable is wound and rewound by employing a difference between the diameter of the outer ring wall and that of the inner ring wall, when the rotational amount of the movable member is constant, the length of the flat cable that can be used can be reduced by increasing the difference between these two diameters. However, the diameter of the inner ring wall is generally determined by the diameter of a rotational shaft, for example, a steering shaft of an automobile car in which the clock spring connector is installed. On the other hand, since the diameter of the outer ring wall can be only slightly increased because there is a demand for reduction in the size of the clock spring connector, the difference between the diameter of the outer ring wall and that of the inner ring wall can also be only slightly increased. Such a clock spring connector therefore has a problem in that it generally requires a long flat cable, and, as is already known, the use of a long flat cable causes difficulties as regards the production of the clock spring connector and thus causes an increase in the total cost thereof.

SUMMARY OF THE INVENTION

The present invention has been achieved in consideration of the above situation, and it is an object of the present invention to provide an inexpensive clock spring connector having excellent operating properties.

In order to achieve the object, the present invention provides a clock spring connector comprising a stationary member, a movable member rotatably mounted relative to the stationary member, and cables received in cable receiving portions defined by the stationary member and the movable member, respective ends of the cables being fixed in the stationary member and let out to the outside thereof, the other ends being fixed in the movable member and let out to the outside thereof, wherein a spacer having an opening is rotatably interposed between the stationary member and the movable member, the cables and a driving belt are wound in one of the cable receiving portions separated from each other by the spacer, the remaining portion of each of the cables and the driving belt are passed through the opening and wound in the other cable receiving portion in the reverse direction, and a driving roller which engages with the driving belt is disposed in the opening of the spacer.

When the movable member is rotated in either the normal direction or the reverse direction relative to the stationary member, the cables having a length which is half the rotational amount of the movable member are let out of one of the cable receiving portions, which are separated by the spacer, toward the other receiving portion through the opening of the spacer. In this case, the driving belt wound in one of the cable receiving portions together with the cables is smoothly let out following the rotation of the spacer because the belt engages with the driving roller so as to rotate the spacer through an angle half the rotational angle of the movable member in the rotational direction thereof.

BRIEF DESCRIPTION OF THE DRAWINGS

FIGS. 1 to 7 relate to a first embodiment of the present invention in which:

FIG. 1 is an exploded perspective view of the whole of a clock spring connector;

FIG. 2 is a plan view of the same;

FIG. 3 is a longitudinal sectional view of the same;

FIG. 4 is a bottom view of an upper case;

FIG. 5 is a perspective view showing a state where a driving roller is accommodated;

FIG. 6 is a sectional view of the same state; and

FIG. 7 is an explanatory view of the operation of flexible cables;

FIGS. 8 to 11 relate to a second embodiment of the present invention in which:

FIG. 8 is a front view of a mechanism for driving a spacer;

FIG. 9 is a plan view of the same mechanism;

FIG. 10 is a sectional view taken along line D—D in FIG. 9; and

FIG. 11 is an explanatory view of the operation of the mechanism for driving a spacer.

DETAILED DESCRIPTION OF PREFERRED EMBODIMENTS

Embodiments of the present invention will be described below with reference to the drawings.

Figure 1:
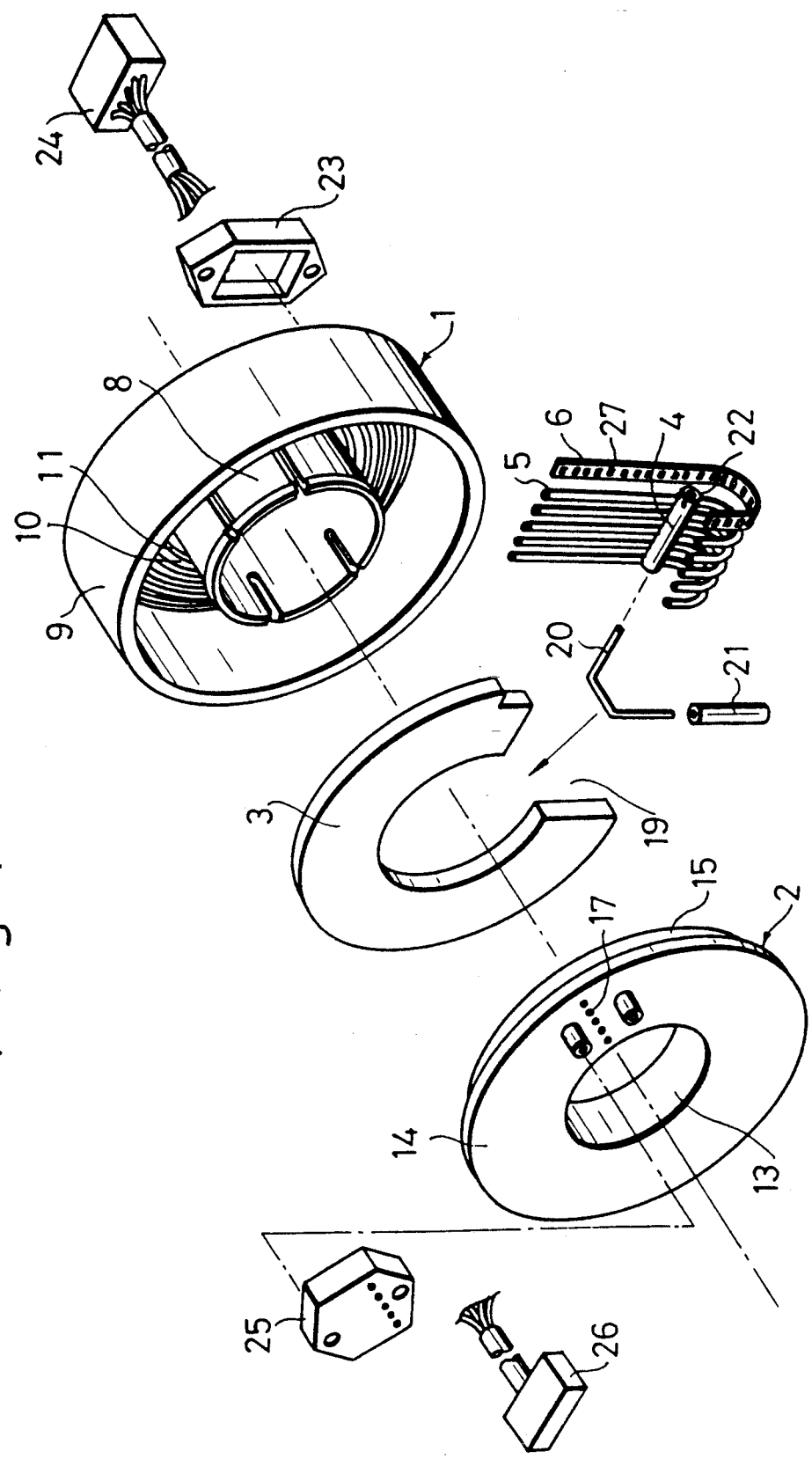
Figure 2:
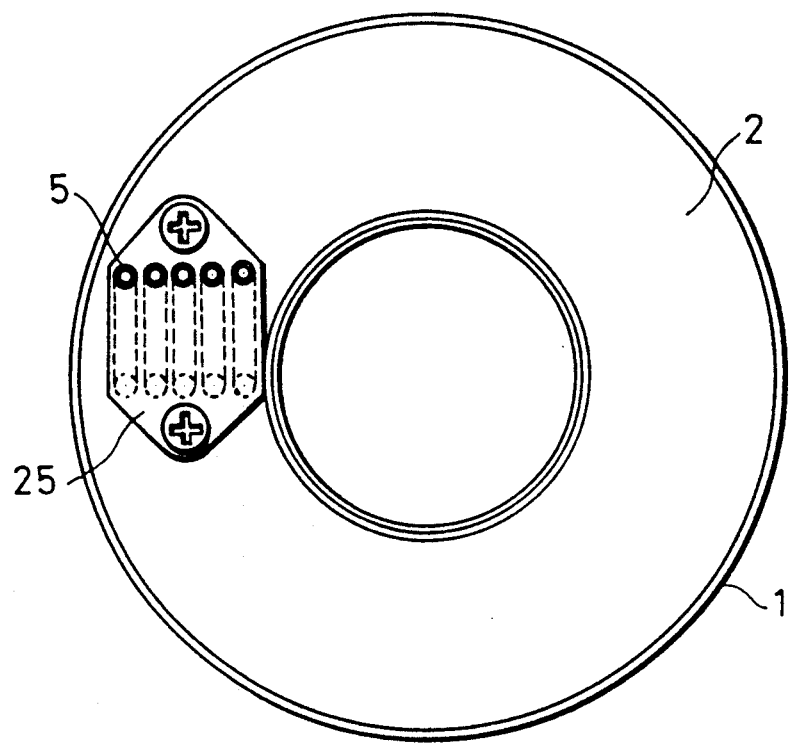
Figure 3:
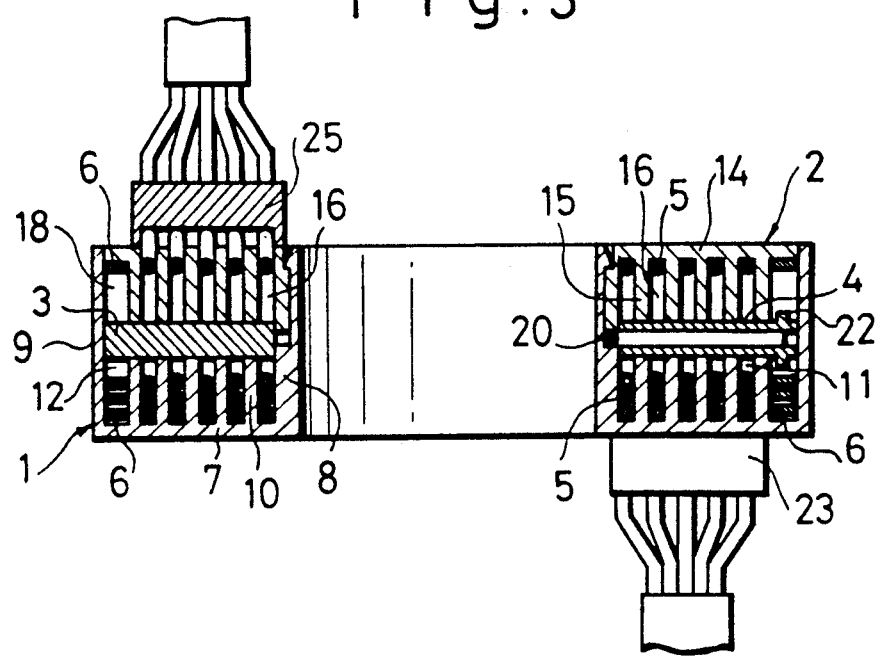
Figure 4:
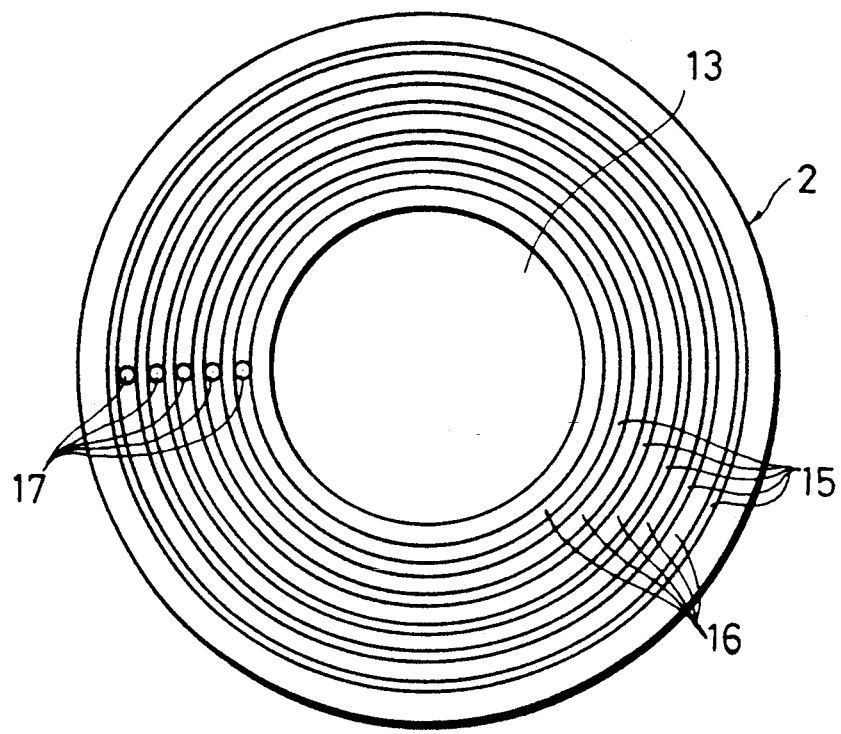
Figure 5:
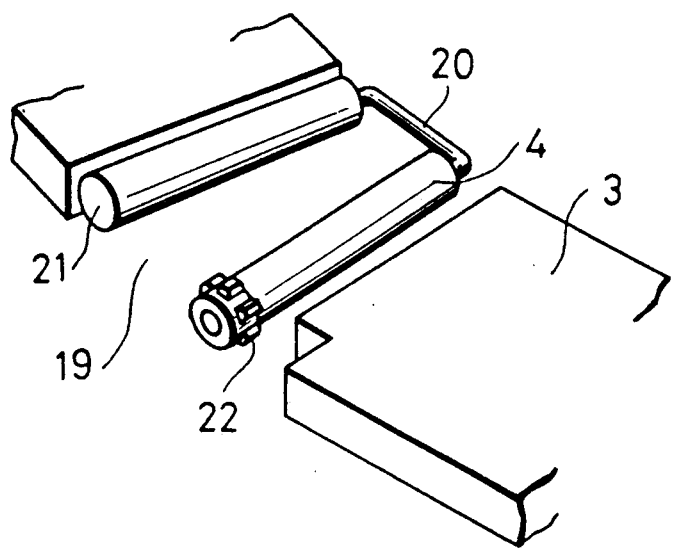
Figure 6:
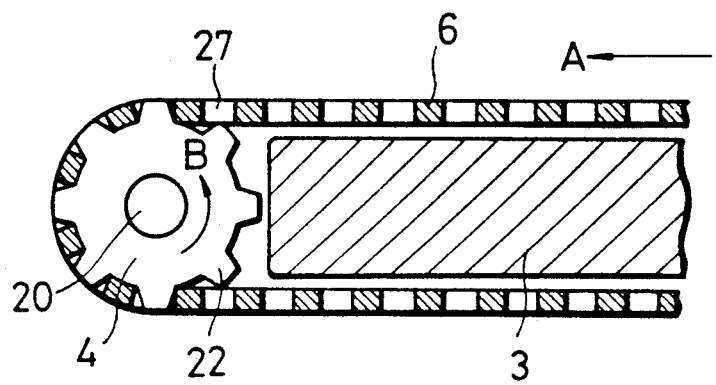
Figure 7A:
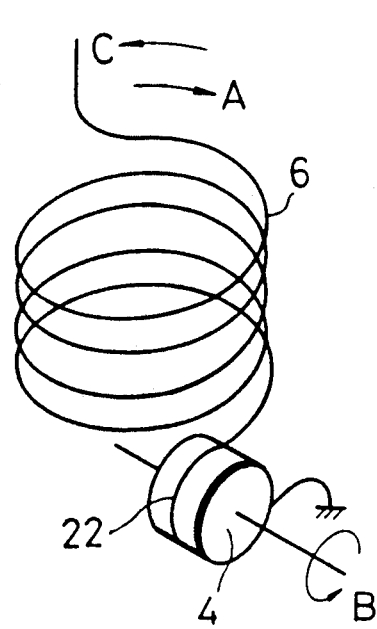
Figure 7B:
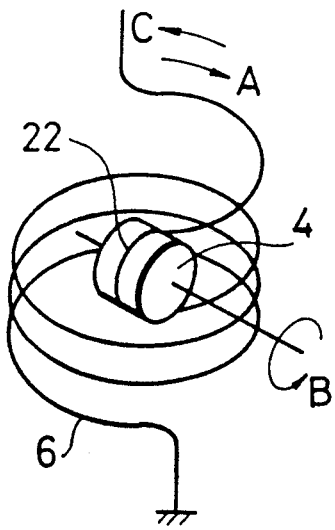

FIG. 1 is an exploded perspective view of a clock spring electrical connector in accordance with a first embodiment of the present invention, FIG. 2 is a plan view of the same, FIG. 3 is a longitudinal sectional view of the same, FIG. 4 is a bottom view of an upper case, FIG. 5 is a perspective view showing the accommodation state of a driving roller, FIG. 6 is a sectional view of the same, and FIG. 7 is an explanatory view of the operation of flexible cables.

As shown in FIGS. 1 to 3, a clock spring connector comprises a lower case 1, an upper case 2 rotatably held relative to the lower case 1, a spacer 3 rotatably held between the cases 1, 2, a driving roller 4 for rotating the spacer 3, and flexible electrical cables 5 and a driving belt which are wound between the cases 1, 2.

The lower case 1 has a bottom plate 7 having a central hole formed at the center thereof, and an inner peripheral wall 8 and an outer peripheral wall 9 which are respectively erectly provided in the inner and outer peripheries of the bottom plate 7. The whole of the lower case 1 is formed into a bottomed cylindrical shape. The bottom plate 7 has a plurality of projection strips 10 which are erectly concentrically provided around the central hole formed at the center thereof. The adjacent projection strips 10 form a plurality (5 in this embodiment) of concentrical first cable receiving grooves 11. The outermost projection strip 10 and the outer peripheral wall 9 form a first belt receiving groove 12 which is formed concentrically with each of the first cable receiving grooves 11.

As shown in FIG. 4, the upper case 2 has a top board 14 in which a central hole 13 is formed at the center thereof so that the upper case 2 is rotatably connected to the lower case 1 by snap coupling it to the inside of the inner peripheral wall 8. The top board 14 has a plurality of projection strips 15 which are vertically concentrically provided around the central hole 13 formed at the center thereof. The adjacent projection strips 15 form a plurality (5 in this embodiment) of concentrical second cable receiving grooves 16. The second cable receiving grooves 16 and the first cable receiving grooves 11 are opposite to each other, with the spacer 3 described below therebetween. A cable lead through hole 17 is formed in the upper portion of each of the second cable receiving grooves 16. A second belt receiving groove 18 is formed between the outermost projection strip 15 and the outer peripheral wall 9 of the lower case 1 so as to concentric with each of the second cable receiving grooves 16. The first and second belt receiving grooves 12, 18 are also opposite to each other, with the spacer described below 13 therebetween (refer to FIG. 3).

The spacer 3 is made of a material such as a synthetic resin molded product having excellent lubricating properties. The spacer 3 has a disc-like shape having an opening 19 which is formed in a portion thereof. The spacer 3 is rotatably held between the first cable receiving grooves 11 of the lower case 1 and the second cable receiving grooves 16 of the upper case 2. As shown in FIG. 5, a shaft member 20 having two arms is inserted into the opening 19, the driving roller 4 and the second roller 21 being respectively rotatably supported by the two arms. The driving roller 4 has a plurality of projections 22 which are formed at equal intervals on the outer side periphery of the driving roller 4 and which engage with the driving belt 6 described below.

The flexible electrical cables 5 each comprise a material called a wire harness which is formed by covering a conductor with an insulator. This embodiment uses five wire harnesses. As shown in FIG. 3, the flexible cables 5 are respectively wound in the first cable receiving grooves 11 of the lower case 1, ends of the flexible cables 5 being passed through the opening 19, wound half on the driving roller 4, the other ends being respectively wound along the opposite second cable receiving grooves 16 of the upper case 2. The ends of the flexible cables 5 are respectively let out to the outside of the lower case 1 through cable lead through holes (not shown), bent into a crank-like shape and fixed in a holder 23 provided on the lower side of the bottom plate 7 of the lower case 1, bundled and then connected to a lower connector 24. On the other hand, the other ends of the flexible cables 5 are respectively let out to the outside of the upper case 2 through the cable lead through holes 17, bent into a crank-like shape and fixed in a holder 25 provided on the upper side of the top board 14 of the upper case 1, bundled and then connected to an upper connector 26.

The driving belt 6 is made of a material such as a synthetic resin film, rubber, elastic plate or the like having high flexibility. The driving belt 6 has a plurality of engagement holes 27 which are formed at equal intervals along the lengthwise direction thereof. Both ends of the driving belt 6 are respectively fixed to the lower case 1 and the upper case 2 so that the driving belt 6 is wound in the first and second belt receiving grooves 12, 18 in the same way as the flexible cables 5. Namely, as shown in FIG. 6, the driving belt 6 wound in the first belt receiving groove 12 is wound half on the driving roller 4 so that the engagement holes 27 engages with the projections 22 of the driving roller 4 and then wound in the reverse direction in the second belt receiving groove 18.

A description will now be given of the operation of the clock spring connector in accordance with this embodiment in a case as an example where the lower case 1 and the upper case 2 are used as a stationary member and a movable member, respectively, mainly with reference to FIGS. 6 and 7. FIG. 7 schematically shows the movement of the driving roller 4 and the driving belt 6, without showing the lower case 1, the upper case 2 and the spacer 3.

FIG. 7(a) shows the state where almost all the driving belt 6 and the flexible cables 5 are wound in the second belt receiving groove 18 and second cable receiving grooves 16 of the upper case 2. In this case, the upper case 2 is at the terminal position of the counterclockwise direction.

For example, when the upper case 2 is rotated for a predetermined amount in the clockwise direction (arrow A direction), the folded portion of each of the flexible cables 5, which is wound on the driving roller 4, is moved for a length corresponding to half of the rotational amount in the arrow A direction so that the flexible cables 5 having a length equal to the movement length of each folded portion are respectively let out of the upper case 2 and wound in the first cable receiving grooves 11 of the lower case 1. In this case, since the projections of the driving roller 4 repeatedly engage with and separate from the engagement holes 27 of the driving belt 6 so that the driving roller 4 revolves through an angle of half the rotational angle of the upper case 2 in the direction of arrow A, while rotating on its axis in the direction of arrow B, the spacer 3 which holds the driving roller 4 is rotated following the folded portions of the flexible cables 5.

When the upper case 2 is rotated N times in the direction of arrow A, as shown in FIG. 7(a), therefore, the driving roller 4 and the spacer 3 are rotated N/2 times in the direction of arrow A, and the driving belt 6 of length corresponding to N/2 turns is wound in the first belt receiving groove 12 from the second belt receiving groove 18 through the opening 19. At the same time, the flexible cables 5 having a length corresponding to N/2 turns are respectively wound in the first cable receiving grooves 11 from the second cable receiving grooves 16 through the opening 19.

The upper case 2 can be further rotated until the driving belt 6 wound in the second belt receiving groove 18 of the upper case 2 and the flexible cables 5 wound in the second cable receiving grooves 16 are completely wound in the first belt receiving groove 12 and the first cable receiving grooves 11, respectively, of the lower case 1. Namely, the upper case can be rotated number of times, which is twice the number of winding of the driving belt 6 and the flexible cables 5 in the upper case 2, in the direction of arrow A. At this time, the upper case 2 is at the terminal position of the clockwise direction.

Conversely, when the upper case 2 is rotated counterclockwise (in the direction of arrow C shown in FIG. 7) from the state where almost all the driving belt 6 and the flexible cables 5 are wound in the first belt receiving groove 12 and the first cable receiving grooves 11, respectively, of the lower case 1, the driving belt 6 which engages with the projections 22 is let out of the first belt receiving groove 12 to the second belt receiving groove 18 so that the driving roller 4 and the spacer 3 are rotated through an angle of half the rotational angle of the upper case 2 in the direction of arrow C. At the same time, the flexible cables having a length equal to the moving amount of the spacer 3 are respectively wound in the second cable receiving grooves 16 of the upper case 2 from the first cable receiving grooves 11 of the lower case 1 through the opening 19.

As described above, since the clock spring connector according to the above-described first embodiment may be provided with the flexible cables 5 each having a length corresponding to half the necessary rotation, the length of each of the flexible cables 5 can be extremely reduced, as compared with conventional clock spring connectors. In addition, since a wire harness can be used as each flexible cable 5, the total cost of a clock spring connector can be significantly reduced. The use of the short flexible cables 5 causes a reduction in the diameter of a cable receiving portion and is thus useful for reducing the size of a clock spring connector.

Further, since the concentric first cable receiving grooves 11 and second cable receiving grooves 16 are formed at equal groove pitches in the opposite surfaces of the lower case 1 and the upper case 2, respectively, with the spacer 3 between the cable receiving grooves 11 and 16, it is possible to prevent not only the flexible cables 5 from entangling with each other but also one of the flexible cable from entangling between the first and second cable receiving grooves 11 and 16. The flexible cables 5 can thus be smoothly wound and unwound.

Further, since the driving belt 6 is wound in the same way as the flexible cables 5 and engaged with the driving roller 4 so as to rotate the spacer 3, the spacer can be caused to follow the movement of the folded portion of each flexible cable 5 when the upper case 2 is rotated. The driving mechanism of the spacer 3 can thus be simplified. From this point, the embodiment is useful for reducing the size of a clock spring and causes the achievement of smooth winding and rewinding of the flexible cables 5.

Figure 8:
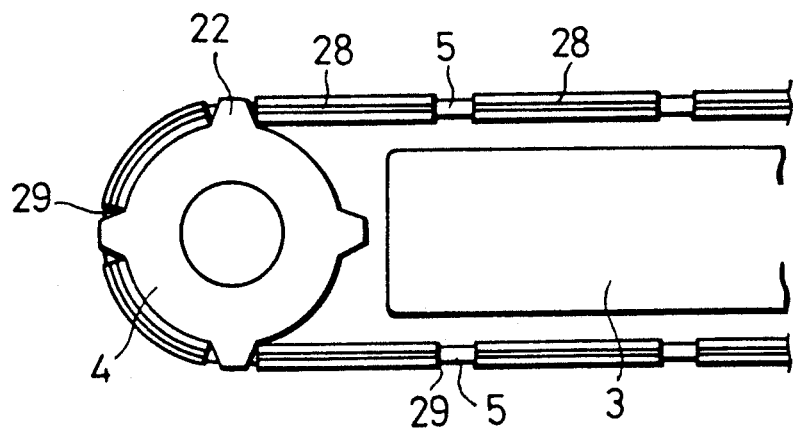
Figure 9:
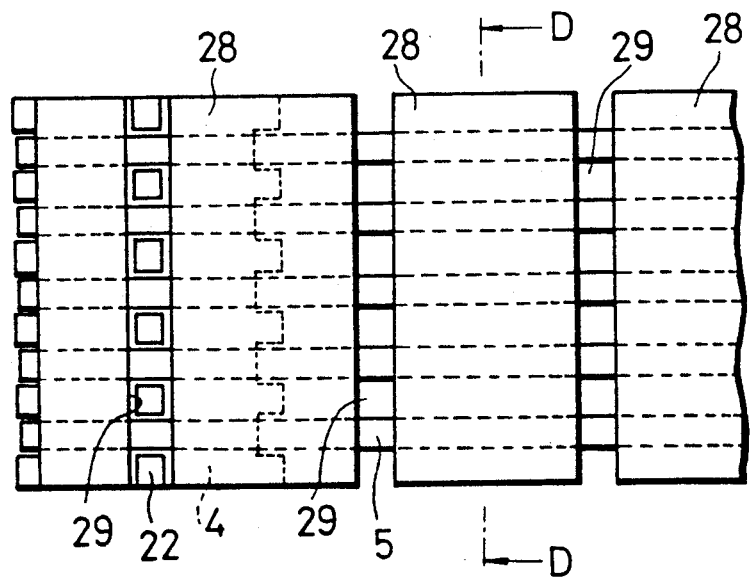
Figure 10:
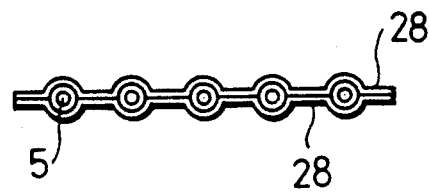
Figure 11:
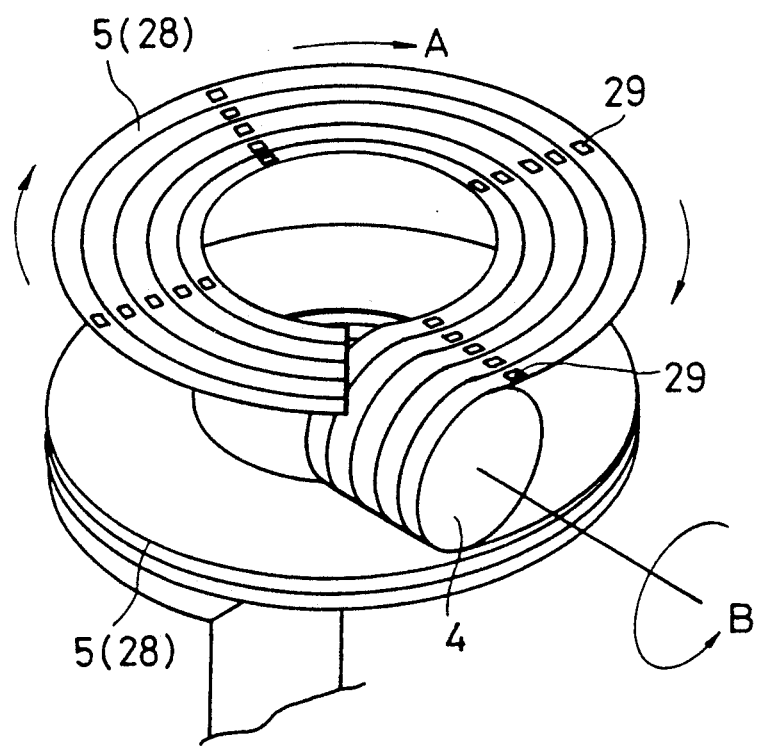

FIGS. 8 to 11 show a clock spring in accordance with another embodiment of the present invention. FIG. 8 is a front view of a mechanism of driving a spacer, FIG. 9 is a plan view of the same, FIG. 10 is a sectional view taken along the line D—D in FIG. 9, and FIG. 11 is an explanatory view of the operation of the driving mechanism. In the drawings, portions corresponding to the portions in the first embodiment are denoted by the same reference numerals.

In this embodiment, as shown in FIGS. 8 to 10, a plurality of flexible cables 5 are concentrically connected to each other by a driving belt 28 made of a flexible material such as a PET film, an elastic thin plate or the like, and the projection strips provided in the upper and lower cases in the first embodiment are removed. The driving belt 28 is divided into portions along the direction of winding, and a plurality of engagement holes 29 are formed by the edges of the adjacent portions of the driving belt 28 and the flexible cables 5. On the other hand, projections 22 which can engage with the holes 29 are formed in the periphery of the driving roller 4.

As schematically shown in FIG. 11, the flexible cables 5 connected to each other by the driving belt 28 are wound between the lower case and the spacer (both of which are not shown in the drawing), ends of the cables being folded to form half loops on the driving roller 4, the other ends being wound between the spacer and the upper case (not shown) in the reverse direction. When the upper case is rotated in the direction of arrow A shown in FIG. 11, therefore, the repeated engagement between the engagement holes 29 and the projections 22 causes the driving belt 28 wound in the upper case to rotate the driving roller 4 and the spacer through an angle which is half the rotational angle of the upper case, in the direction of arrow A. At the same time, the flexible cables 5 with a length corresponding to the rotational angle of the spacer are wound, together with the driving belt 6, in the lower case from the upper case through the opening.

The second embodiment configured as described above enables the production of a small inexpensive clock spring connector using short flexible cables in the same way as the first embodiment. The second embodiment also has the effect of simplifying the assembly work of a clock spring connector because a plurality of flexible cables 5 are previously connected to each other by a driving belt 28.

Although each of the above embodiments concerns a case in which a lower case 1 and an upper case 2 are used as a stationary member and a movable member, the upper case 2 and the lower case 1 may be conversely used as a stationary member and a movable member, respectively.

Although each of the above embodiments concerns a case in which a plurality of wire harnesses are used as flexible cables 5, bare conductor wires without insulator covers, coated flat conductor wires, multi-core cables each comprising a plurality of lead wires from different circuits which are coated with a common insulator may also be used.

As described above, the present invention enables a significant decrease in the length of each cable, the simplification of the structure of a clock spring connector and smooth winding and rewinding of cables. Thus the present invention can provide an inexpensive clock spring connector having excellent operating properties.

What is claimed is:

1. A clock spring electrical connector comprising:
   a stationary member defining a first cable receiving portion having a plurality of first projection strips defining first cable receiving grooves;
   a movable member rotatably coupled to said stationary member, said movable member defining a second cable receiving portion having a plurality of second projection strips defining second cable receiving grooves;

a plurality of electrical cables each having one end coupled to said stationary member and another end coupled to said movable member, portions of said cables wound in a first direction in said first cable receiving grooves, and other portions of said cables wound in a second direction in said second cable receiving grooves;

a driving belt having one end coupled to said stationary member and another end coupled to said movable member, said driving belt having one portion wound in said first direction in said first cable receiving portion, and another portion wound in said second direction in said second cable receiving portion;

a spacer rotatably disposed between said first and said second cable receiving portions, said spacer including an opening; and a driving roller rotatably disposed in said opening, said plurality of cables being looped around said driving roller, said driving belt being operably coupled to said driving roller such that when said movable member is rotated with respect to said stationary member, said belt is unwound from said first or second cable receiving portion, passed through said opening in said spacer and rewound on said second or first cable receiving portion, and said first cable receiving grooves and said second cable receiving grooves being opposed such that when a portion of one of said cables is transferred from one of said first or second cable receiving grooves, said portion of said cable is passed through said opening to an opposed second or first cable receiving groove.

2. A clock spring electrical connector comprising a stationary member defining a first cable receiving portion, a movable member rotatably mounted relative to said stationary member and defining a second cable receiving portion, a cable band forming integrally a plurality of electrical cables received in said first and second cable receiving portions, one end of said cable band being fixed to said stationary member and fed out to the outside thereof, the other end of said cable band fixed to said movable member and fed out to the outside thereof, said cable band defining engaging holes, a spacer having an opening is rotatably interposed between said stationary member and said movable member, said cable band is wound in either one of said cable receiving portions, said cable receiving portions being separated by said spacer, the remaining portion of each of said cables is wound in the other receiving portion in the reverse direction through said opening, and a driving roller having engaging projections on its surface disposed in said opening, said engaging projections being arranged to engage said engaging holes of said cable band.

* * * * *